United States Patent
Hada et al.

(10) Patent No.: US 12,442,435 B2
(45) Date of Patent: Oct. 14, 2025

(54) TELESCOPIC DEVICE

(71) Applicant: TOYOTA JIDOSHA KABUSHIKI KAISHA, Toyota (JP)

(72) Inventors: Yoshitaka Hada, Toyota (JP); Shiyogo Nakamura, Nisshin (JP); Yoshihiro Okuda, Miyoshi (JP); Takatoshi Morimitsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 18/405,038

(22) Filed: Jan. 5, 2024

(65) Prior Publication Data
US 2024/0295255 A1 Sep. 5, 2024

(30) Foreign Application Priority Data
Mar. 3, 2023 (JP) ................................. 2023-032690

(51) Int. Cl.
*F16H 19/06* (2006.01)

(52) U.S. Cl.
CPC ..... *F16H 19/0663* (2013.01); *F16H 19/0618* (2013.01); *F16H 19/0645* (2013.01)

(58) Field of Classification Search
CPC .. F16H 19/06; F16H 19/0618; F16H 19/0645; F16H 19/0663; F16H 2019/0613; B25J 9/104; B25J 18/025
See application file for complete search history.

(56) References Cited

U.S. PATENT DOCUMENTS

| | | | |
|---|---|---|---|
| 2017/0001314 A1* | 1/2017 | Yim | B25J 18/02 |
| 2018/0351247 A1* | 12/2018 | Hall | H01Q 1/1235 |
| 2021/0194388 A1* | 6/2021 | Iwamoto | H02N 2/025 |
| 2021/0214203 A1* | 7/2021 | Erickson | B66F 11/00 |
| 2021/0341040 A1* | 11/2021 | Komura | F16H 9/26 |
| 2021/0341041 A1* | 11/2021 | Iwamoto | F16H 19/0618 |

FOREIGN PATENT DOCUMENTS

JP 4607772 B2 1/2011

* cited by examiner

*Primary Examiner* — Joseph Brown
(74) *Attorney, Agent, or Firm* — SoraIP, Inc.

(57) ABSTRACT

A telescopic device includes an expandable tubular structure and an inner-side guide member disposed inside the tubular structure. The tubular structure includes an outer belt and an inner belt. The outer belt and the inner belt each have a plurality of first protrusions and holes arranged in a row in the longitudinal direction. The inner-side guide member has a first spiral groove extending along the plurality of first protrusions. When the inner-side guide member rotates in one direction, the outer belt and the inner belt are sent out, so that they are spirally wound while being engaged with each other, and the tubular structure extends. The first spiral groove has a body and an end portion extending from the body toward the root of the inner-side guide member. The distance between the end portion of the first spiral groove and the main part of the first spiral groove is small.

1 Claim, 8 Drawing Sheets

TELESCOPIC DEVICE

CROSS-REFERENCE TO RELATED APPLICATION

This application claims priority to Japanese Patent Application No. 2023-032690 filed on Mar. 3, 2023, incorporated herein by reference in its entirety.

BACKGROUND

1. Technical Field

The present disclosure relates to a telescopic device.

2. Description of Related Art

According to Japanese Patent No. 4607772 (JP 4607772 B), a spiral telescopic actuator includes a first strip member and a second strip member, each configured in a strip shape. The first strip member and the second strip member transition from a separated state of being spirally accommodated on a horizontal plane, to a tubular configuration state in of being spirally wound to form a tubular structure. The tubular structure is formed by spirally winding these strip members about an axial line, at positions offset from each other in a direction of the axial line.

The inventors of the present application have discovered the following issues.

In such a spiral telescopic actuator, the strip members (belts) may become twisted when transitioning from the separated state to the tubular state. Twisting of the strip members might cause excessive contact between the strip members and a spiral groove of an inner-side guide member.

SUMMARY

The present disclosure has been made in view of the issue described above, and provides a telescopic device that is capable of suppressing twisting of the belts.

A telescopic device according to the present disclosure includes:
  a tubular structure that is telescopable, and
  an inner-side guide member that is disposed on an inner side of the tubular structure.
  The tubular structure includes an outer belt, and an inner belt disposed on an inner side of the outer belt,
    the outer belt and the inner belt are each provided with a plurality of first protrusions and holes arranged in a row in a longitudinal direction,
    the inner-side guide member has a first spiral groove extending along the first protrusions, rotation of the inner-side guide member in one direction feeds out the outer belt and the inner belt such that the outer belt and the inner belt are spirally wound in a state of being engaging each other, and the tubular structure is extended,
    rotation of the inner-side guide member in another direction draws in the outer belt and the inner belt such that the state of being engaged with each other and wound is disengaged, and the tubular structure is collapsed,
    the first spiral groove includes a main part, and an end portion extending from the main part to a basal side of the inner-side guide member, and
    a spacing between the end portion of the first spiral groove and the main part of the first spiral groove is small.

Also, a pitch of spiraling of the end portion of the first spiral groove may be smaller as compared to a pitch of spiraling of the main part of the first spiral groove, or a width of the end portion of the first spiral groove may be wider as compared to a width of the main part of the first spiral groove.

The outer belt and the inner belt may be each provided with a plurality of second protrusions arranged in a row in the longitudinal direction, further on the basal side of the inner-side guide member than the first protrusions,
  the inner-side guide member may further include a second spiral groove extending along the second protrusions,
  the second spiral groove may include a main part and an end portion extending from the main part to the basal side of the inner-side guide member, and
  a spacing between the end portion of the second spiral groove and the main part of the second spiral groove may be small.

According to the present disclosure, twisting of the belts can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
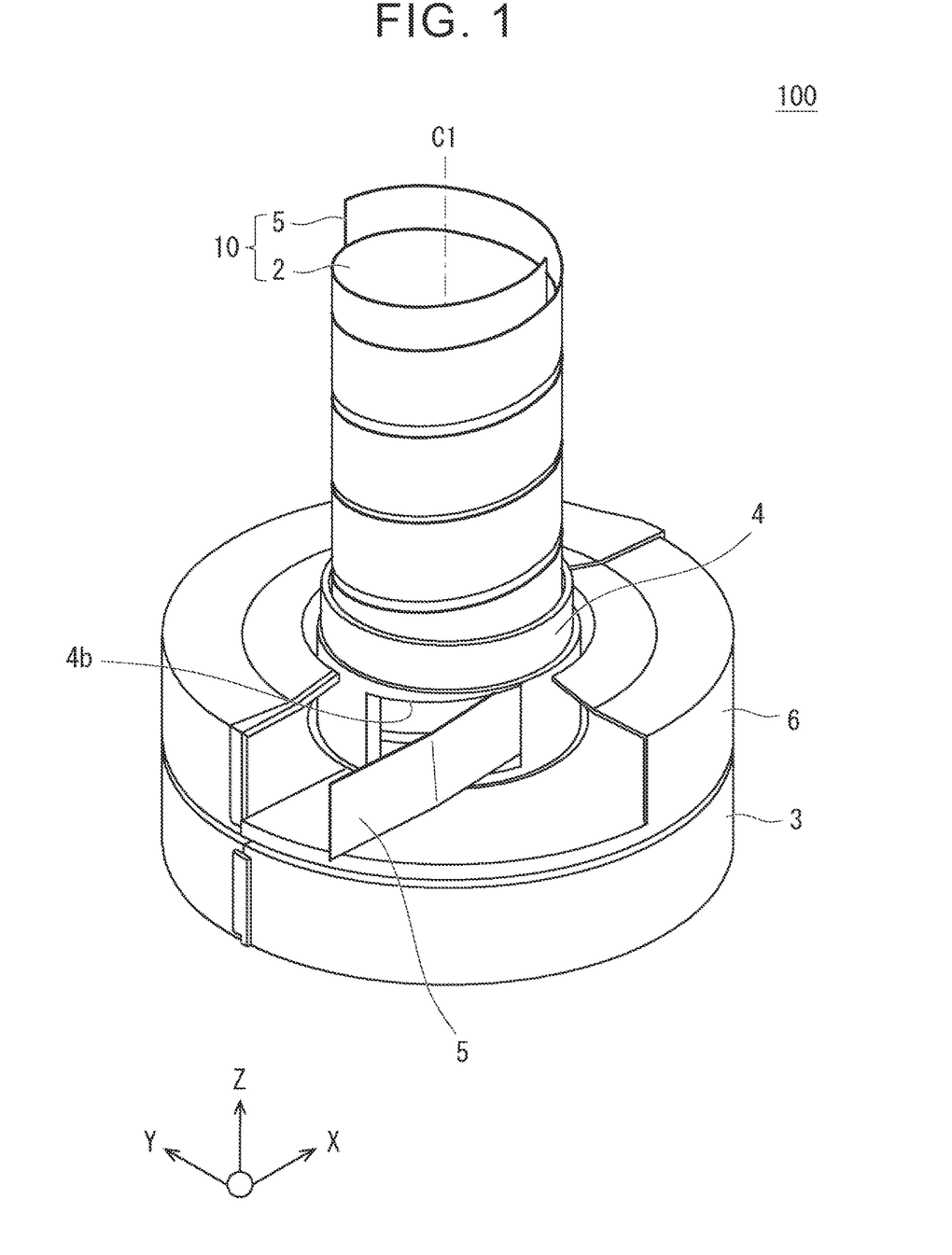
FIG. 1 is an overall perspective view of a telescopic device according to Embodiment 1.

The right-handed XYZ coordinates shown in FIG. 1 and other figures are for convenience in describing the positional relationships of components. Normally, the plus direction of the Z-axis is vertically upward. The XY plane is the horizontal plane. These are common among drawings.

Related Technology

Figure 8:
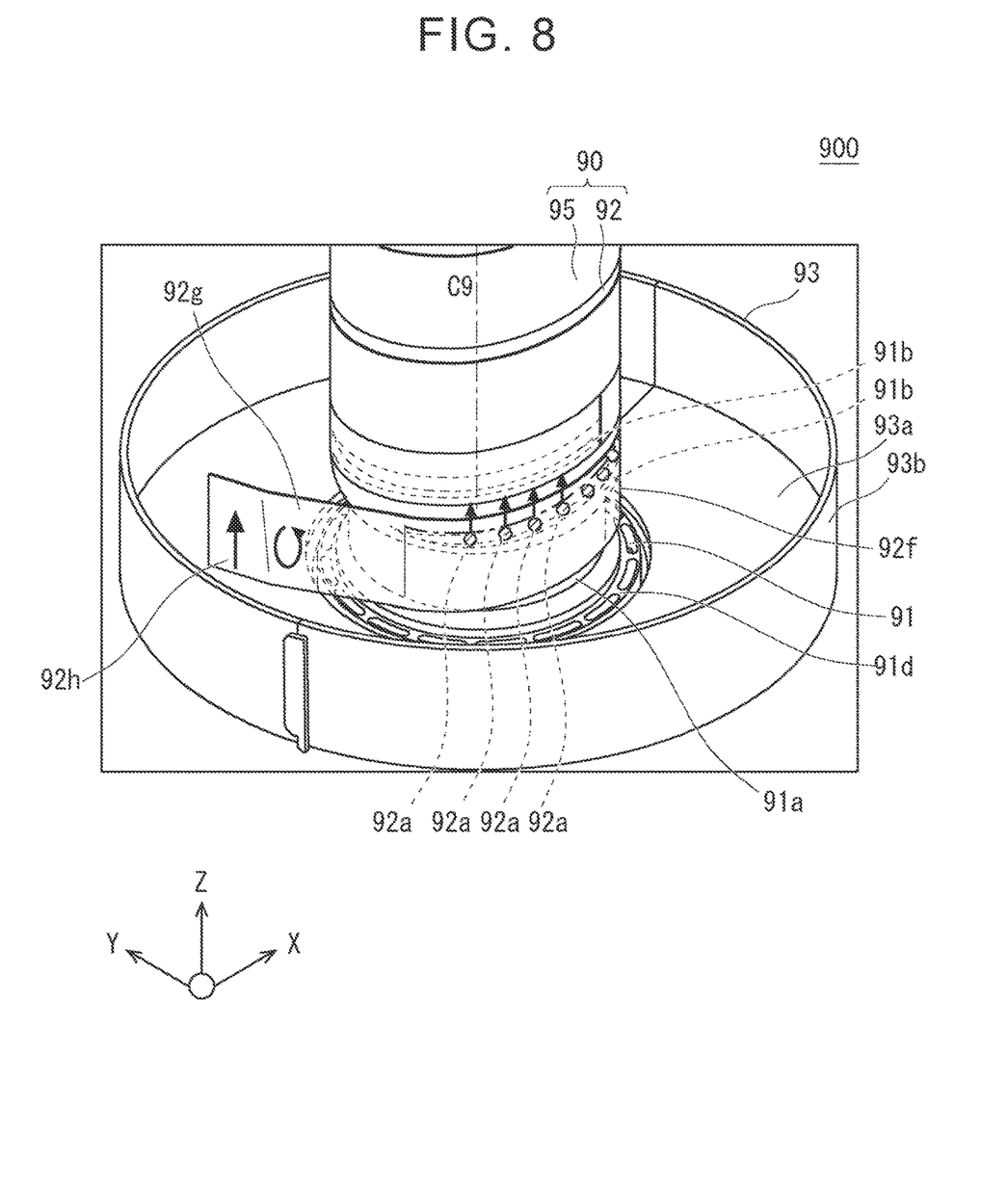
FIG. 8 is a perspective view of a main part of the telescopic device according to the problem to be solved by the present disclosure.

Prior to specific embodiments to which the present disclosure is applied, a telescopic device according to technology related to the present disclosure will be described with reference to FIG. 8. The telescopic device 900 shown in FIG. 8 can extend or retract the tubular structure 90. For ease of understanding, illustration of a portion of the inner belt 2, the cover, and the upper belt case is omitted in FIG. 8.

The operation of the telescopic device 900 to expand the tubular structure 90 will be described. The inner-side guide member 91 rotates in one direction around the central axis C9. Then, the inner-side guide member 91 winds up the outer belt 95 and the inner belt 92. Subsequently, the outer belt 95 is delivered from the upper belt case (not shown) to the inner-side guide member 91 through the first opening of the cover (not shown). An inner belt 92 is sent from the lower belt case 93 to the inner-side guide member 91 through the second opening of the cover. The outer belt 95 and the inner belt 92 are spirally wound around the inner-side guide member 91 while engaging with each other. In other words, a transition is made from the separated state in which the outer belt 95 and the inner belt 92 are housed in the upper belt case and the lower belt case 93, respectively to the state in which the outer belt 95 and the inner belt 92 are spirally wound. Thereby, the tubular structure 90 is elongated.

Also, the operation of the telescopic device 900 for contracting the tubular structure 90 will be described. The inner-side guide member 91 rotates in the other direction around the central axis C9. Then, the outer belt 95 and the inner belt 92 which are already engaged and wound are untied. Subsequently, the outer belt 95 is drawn from the inner-side guide member 91 into the upper belt case through the first opening of the cover. The inner belt 92 is sent from the inner-side guide member 91 to the lower belt case 93 through the second opening of the cover. The outer belt 95 is housed in the upper belt case. The inner belt 92 is housed in the lower belt case 93. In other words, a transition is made from the tubular configuration state in which the outer belt 95 and the inner belt 92 are spirally wound to the state in which the outer belt 95 and the inner belt 92 are stored in the upper belt case and the lower belt case 93, respectively. Thereby, the tubular structure 90 contracts.

In such an extension operation or contraction operation of the telescopic device 900, transition is made between the above-described separated state and the above-described cylinder configuration state. The inner belt 92 includes a contact portion 92f, a separation portion 92g, and an accommodated portion 92h. The contact portion 92f, the separation portion 92g, and the accommodated portion 92h are connected in this order in the longitudinal direction of the inner belt 92. The contact portion 92f is spirally wound around the outer belt 95 and contacts the inner-side guide member 91. The separation portion 92g extends from the end portion of the contact portion 92f to the lower belt case 93 and is separated from the inner-side guide member 91. The accommodated portion 92h extends from the end portion of the separation portion 92g and is accommodated in the lower belt case 93. A side wall 93b of the lower belt case 93 extends annularly around the central axis C9. The accommodated portion 92h of the inner belt 92 is preferably wound along the inner wall surface of the side wall 93b.

In addition, the inner belt 92 has a plurality of first protrusions 92a arranged in a row in the longitudinal direction of the inner belt 92 and a plurality of second protrusions (not shown) arranged in a row under the plurality of first protrusions 92a. The plurality of first protrusions 92a protrude toward the inner-side guide member 91 and have shapes that can be fitted into the first spiral groove 91b. A plurality of first protrusions 92a on the contact portion 92f are fitted with the first spiral groove 91b. The plurality of second protrusions on the contact portion 92f are not fitted with the first spiral groove 91b and the second spiral groove (not shown), and are separated from the inner-side guide member 91. As a result, the upper side of the contact portion 92f is held in the first spiral groove 91b. The lower side of the contact portion 92f is separated from the inner-side guide member 91 without being fastened.

The lower surface 93a of the lower belt case 93 pushes up the accommodated portion 92h. Therefore, the plurality of first protrusions 92a press against the upper wall surface of the first spiral groove 91b, and the main surface of the contact portion 92f, particularly the end portion of the contact portion 92f on the side of the separation portion 92g, tilts with respect to the central axis C9. On the other hand, the main surface of the accommodated portion 92h is substantially parallel to the central axis C9. Therefore, the main surface of the contact portion 92f and the main surface of the accommodated portion 92h extend in different directions. As described above, the contact portion 92f, the separation portion 92g, and the accommodated portion 92h are connected in the longitudinal direction of the inner belt 92 in this order. The separation portion 92g is twisted by receiving force in the twisting direction. As described above, the inner belt 92 is twisted when transitioning between the separated state and the tube configuration state.

Hereinafter, specific embodiments to which the present disclosure is applied will be described in detail with reference to the drawings. However, the present disclosure is not limited to the following embodiments. Further, in order to clarify the explanation, the following description and drawings are simplified as appropriate.

First Embodiment

Figure 2:
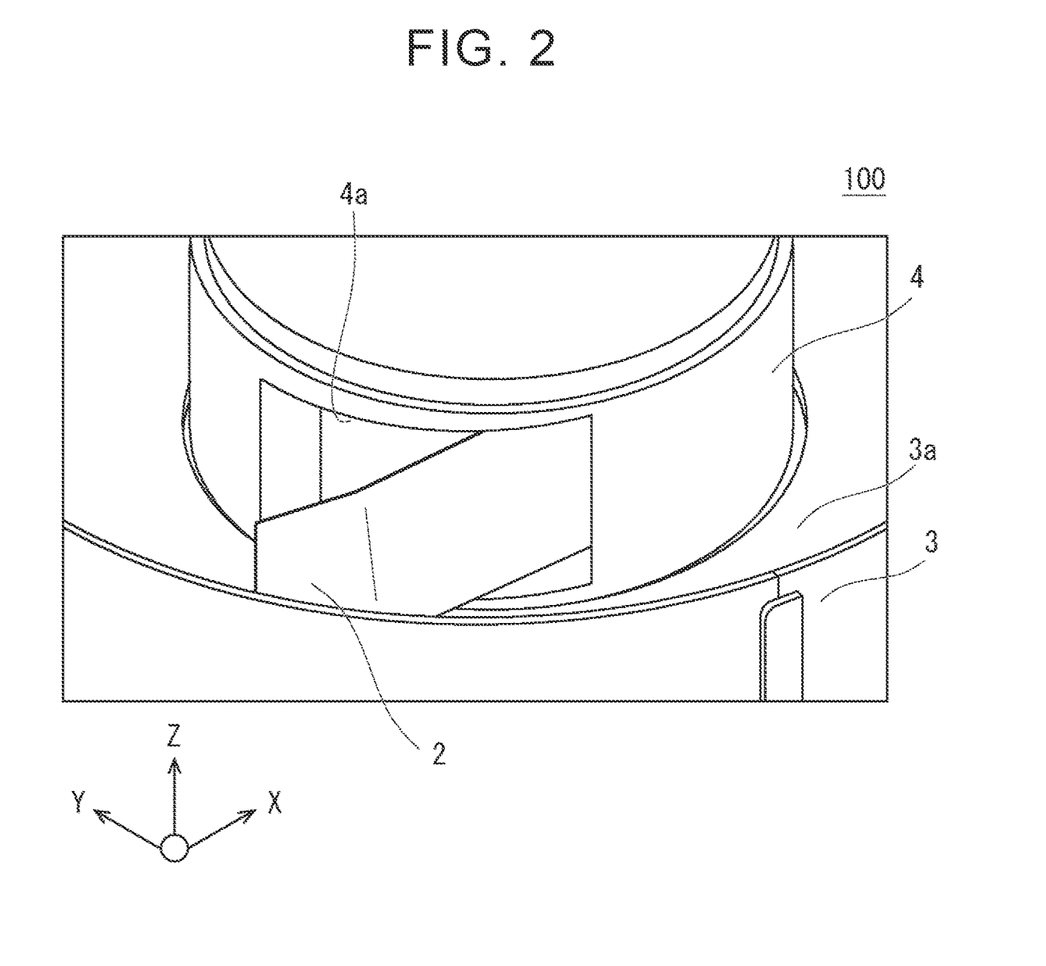
FIG. 2 is a perspective view of a main part of the telescopic device according to Embodiment 1.
Figure 3:
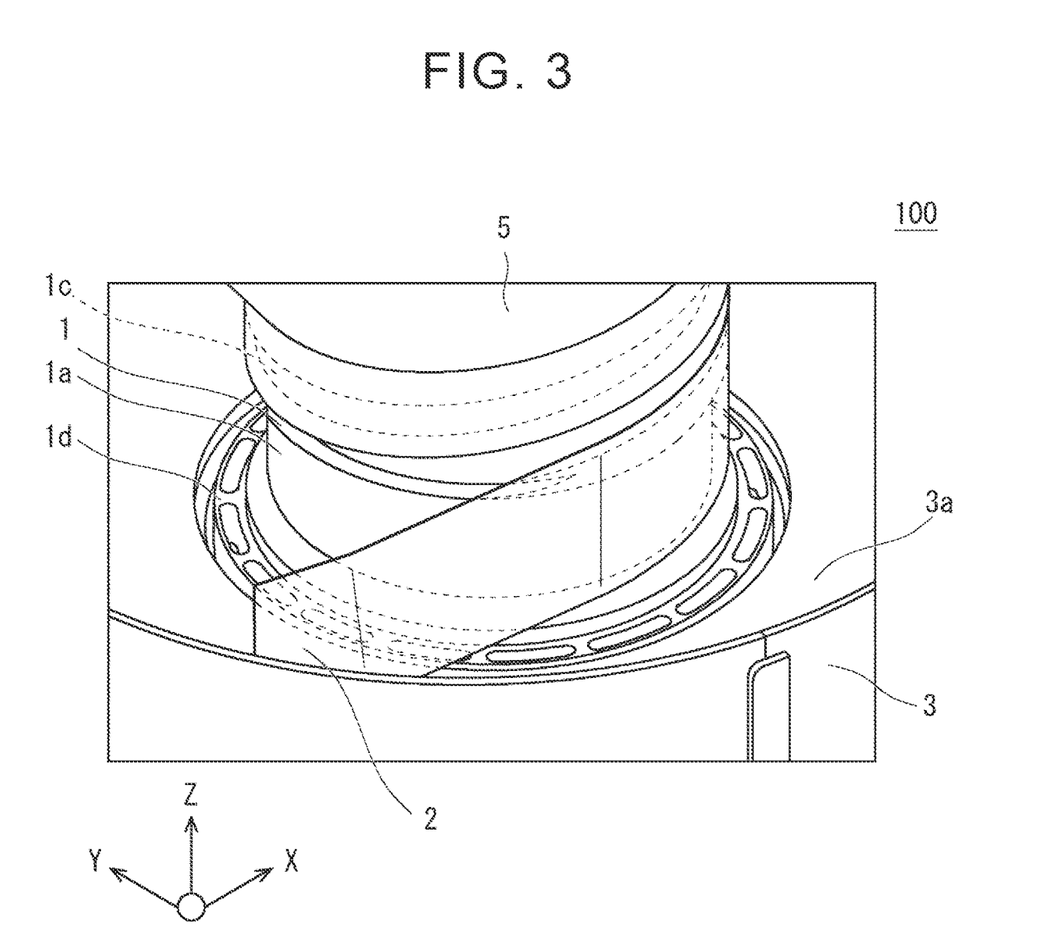
FIG. 3 is a perspective view of a main part of the telescopic device according to Embodiment 1.
Figure 4:
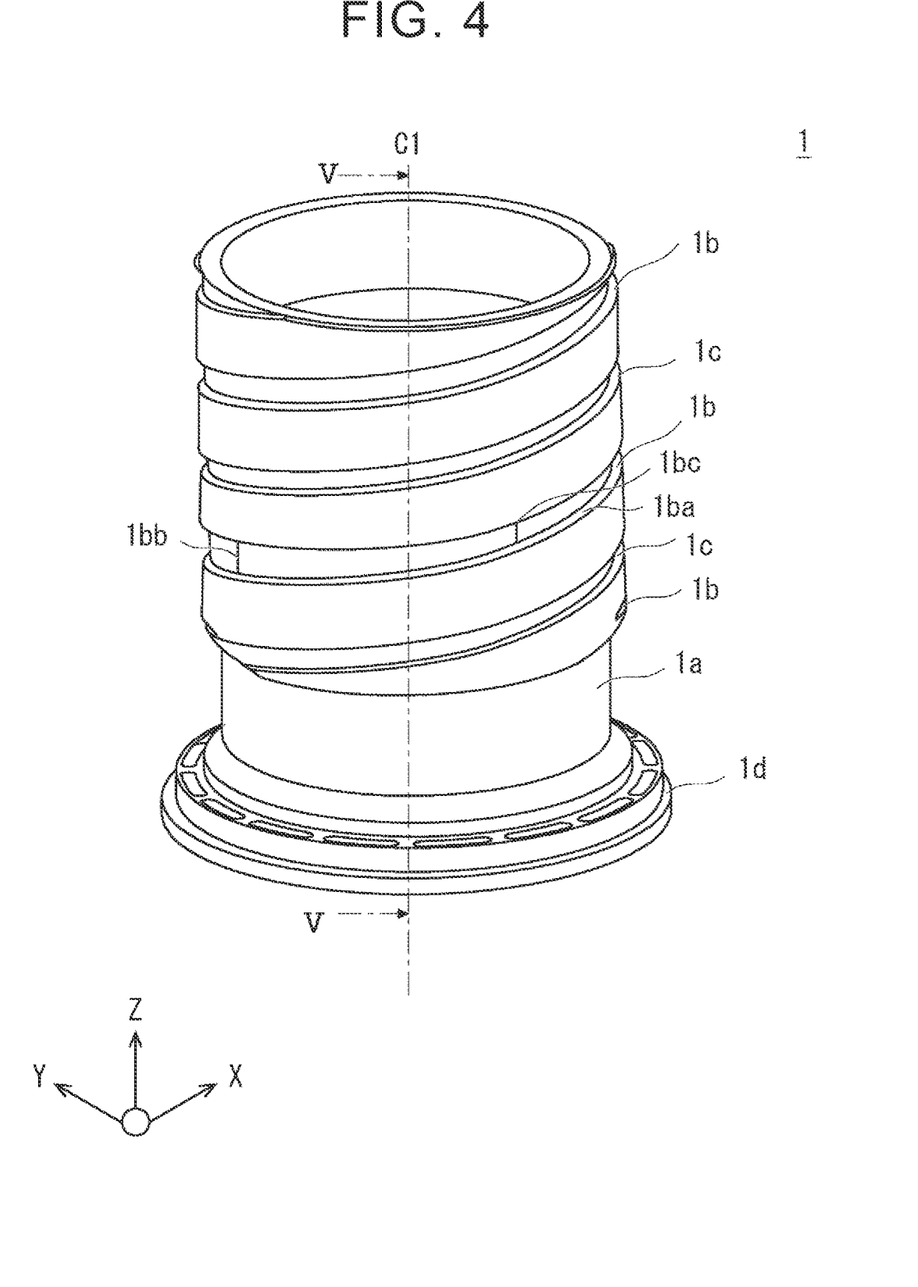
FIG. 4 is a perspective view of an example of an inner-side guide member according to Embodiment 1.
Figure 5:
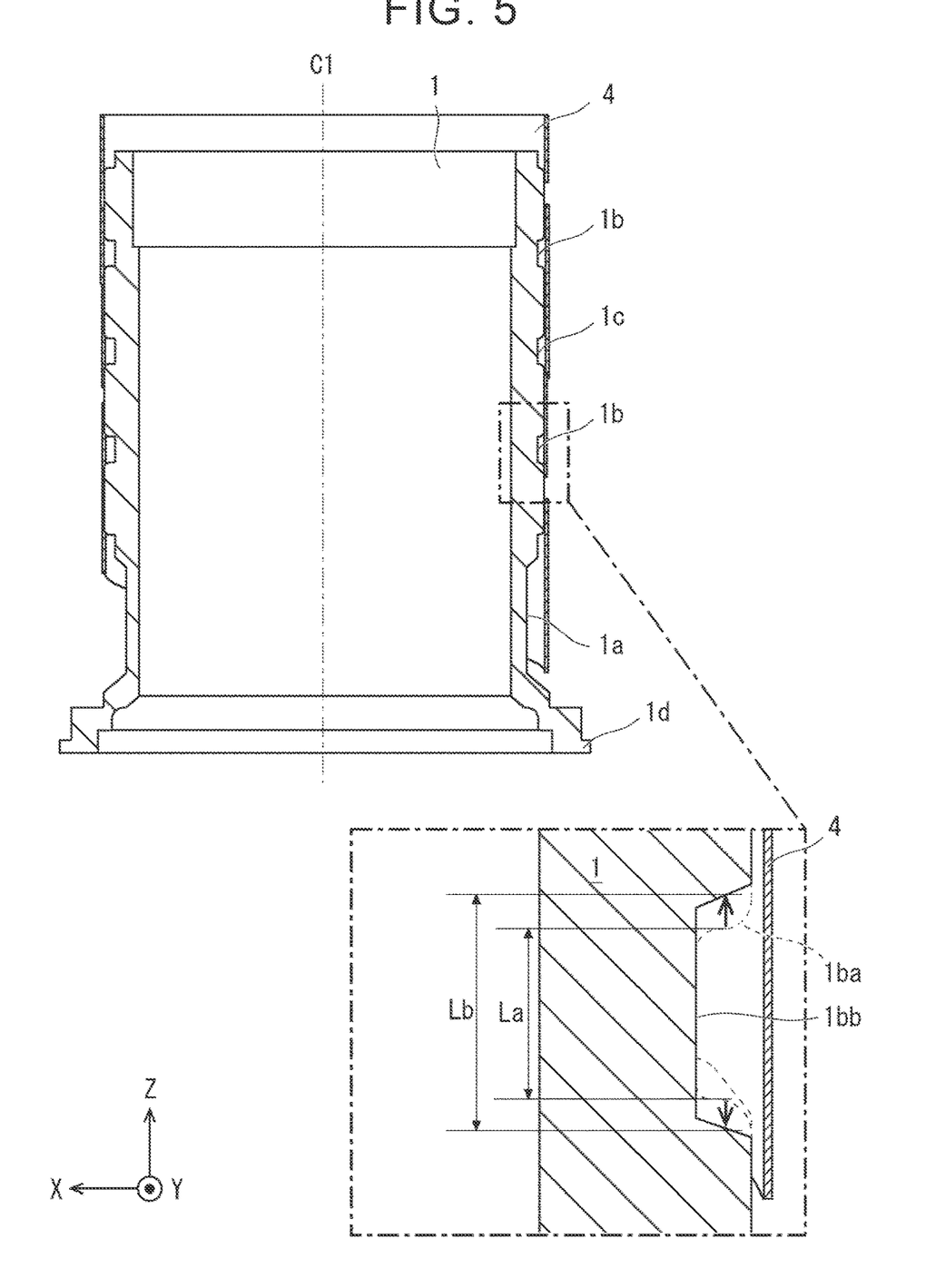
FIG. 5 is a cross-sectional view and an enlarged cross-sectional view of an example of an inner-side guide member taken along section line V-V.
Figure 6:
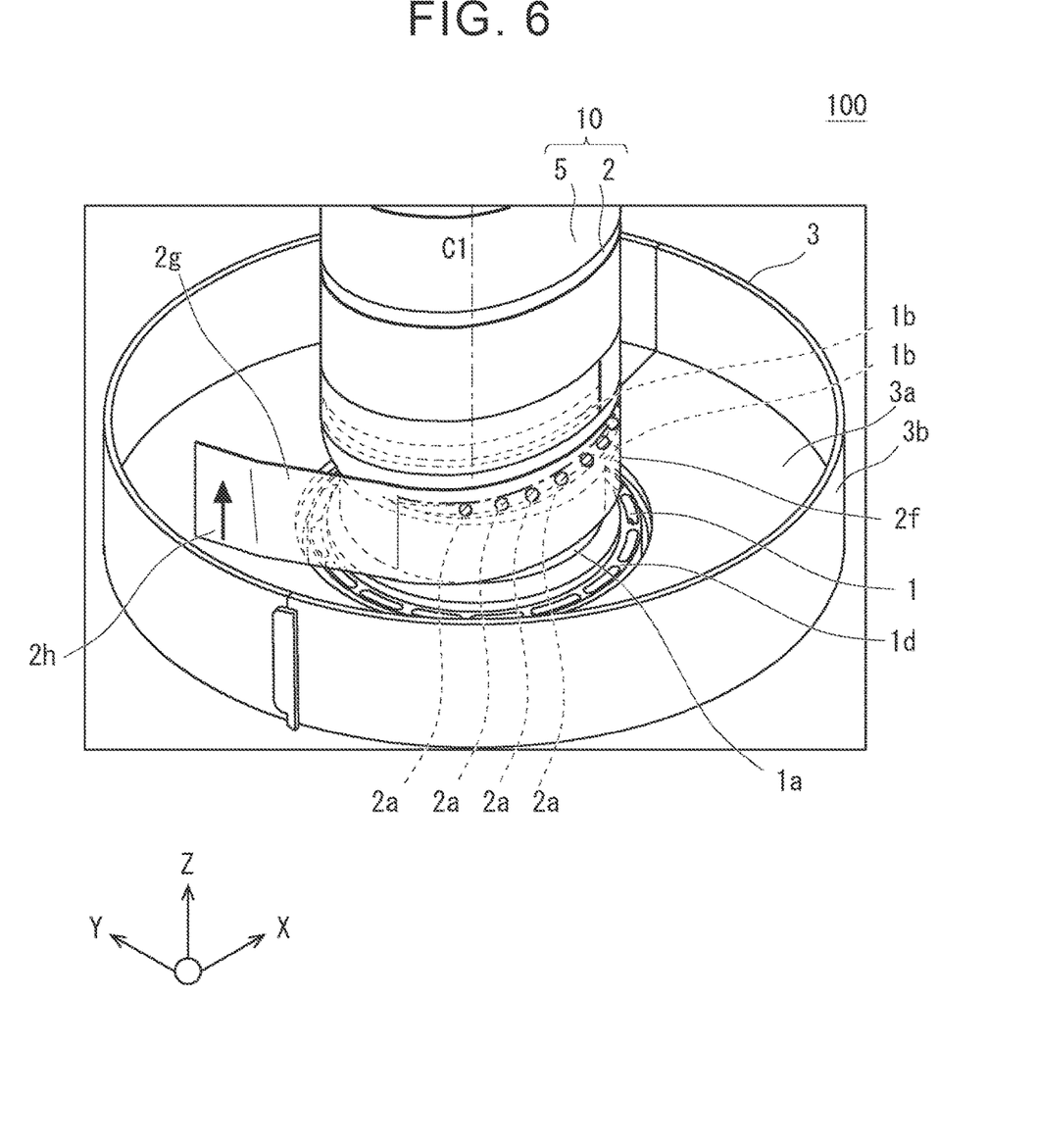
FIG. 6 is a diagram showing the operation of the telescopic device according to Embodiment 1.

Embodiment 1 will be described with reference to FIGS. 1 to 6. FIG. 1 is an overall perspective view of a telescopic device according to Embodiment 1. FIG. 2 is a perspective view of the essential parts of the telescopic device shown in FIG. 1 with the upper belt case 6 removed. FIG. 3 is a perspective view of the essential parts of the telescopic device shown in FIG. 2 with the cover 4 removed. FIG. 4 is a perspective view of an example of an inner-side guide member according to Embodiment 1. FIG. 5 is a cross-sectional view and an enlarged cross-sectional view of one example of the inner-side guide member shown in FIG. 4, taken along section line V-V. FIG. 6 is a diagram showing the operation of the telescopic device according to Embodiment 1. For ease of understanding, a portion of the outer belt 5 and a portion of the front side of the upper belt case 6 are omitted from FIG. 1. Moreover, in FIGS. 2, 3 and 6, illustration of a part of the inner belt 2 is omitted.
Configuration As shown in FIGS. 1 and 3, the telescopic device 100 includes a tubular structure 10 and an inner-side guide member 1. The telescopic device 100 according to the first embodiment further includes a lower belt case 3, a cover 4 and an upper belt case 6.

The tubular structure 10 can be expanded and contracted in the central axis C1 direction (here, the Z-axis direction). The tubular structure 10 has an outer belt 5 and an inner belt 2. In the tubular structure 10, the inner belt 2 is arranged inside the outer belt 5. The inner belt 2 and the outer belt 5 are preferably made of flexible material. Such material is, for example, steel.

The inner belt 2 has a plurality of first protrusions 2a (see FIG. 6) arranged in a row in the longitudinal direction of the inner belt 2, and a plurality of second protrusions (not shown) arranged in a row and a plurality of holes (not shown) below the plurality of first protrusions 2a in a tubular structure 10. Specifically, the first protrusion 2a and the second protrusion may protrude from the outer edge of the hole. The first protrusion 2a and the second protrusion extend cylindrically, and the diameters of the first protrusion 2a and the second protrusion are preferably reduced from the base to the tip. In the tubular structure 10, the first protrusion 2a and the second protrusion protrude toward the inner-side guide member 1 side. The plurality of first protrusions 2a protrude toward the inner-side guide member 1 and have a shape that can be fitted into the first spiral groove 1b.

Like the inner belt 2, the outer belt 5 has a plurality of protrusions (not shown) provided in two rows in the longitudinal direction of the outer belt 5 and a plurality of holes (not shown). Specifically, the plurality of protrusions of the outer belt 5 may protrude from the outer edge of the hole. The plurality of protrusions of the outer belt 5 extend in a cylindrical shape, and the diameter of the protrusions is preferably reduced from the base to the tip. In the tubular structure 10, the plurality of protrusions of the outer belt 5 protrude toward the inner-side guide member 1 side.

In the tubular structure 10, the inner belt 2 and the outer belt 5 are engaged with each other. Specifically, when the inner belt 2 and the outer belt 5 are wound around the inner-side guide member 1, the plurality of protrusions of the outer belt 5 are inserted into the corresponding plurality of holes of the inner belt 2, respectively, and the inner belt 2 and the outer belt 5 are engaged with each other.

The inner-side guide member 1 is a tubular body arranged inside the tubular structure 10. As shown in FIG. 4, the outer peripheral surface 1a of the inner-side guide member 1 is formed with a first spiral groove 1b, a second spiral groove 1c, and a flange 1d. The first spiral groove 1b and the second spiral groove 1c are provided apart from the flange 1d on the outer peripheral surface 1a. As shown in FIG. 4, the flange 1d is provided on the root side of the inner-side guide member 1 (here, in the negative direction of the Z axis). The first spiral groove 1b and the second spiral groove 1c extend along the plurality of first protrusions 2a and the plurality of second protrusions of the inner belt 2 in the tubular structure 10, respectively. Specifically, the first spiral groove 1b extends along the plurality of first protrusions 2a in the tubular structure 10. The second spiral groove 1c extends along the plurality of second protrusions of the inner belt 2 described above. The first spiral groove 1b and the second spiral groove 1c can be fitted with the plurality of first protrusions 2a and the plurality of second protrusions of the inner belt 2, respectively. The first spiral groove 1b and the second spiral groove 1c extend in parallel on the outer peripheral surface 1a.

The first spiral groove 1b has a main part 1ba and an end portion 1bb. The end portion 1bb extends from the main part 1ba toward the base of the inner-side guide member 1. The distance between the end portion 1bb and the main part 1ba is small. Specifically, as shown in FIG. 5, the width Lb of the end portion 1bb of the first spiral groove 1b is wider than the width La of the main part 1ba of the first spiral groove 1b. For example, the width Lb of the end portion 1bb may gradually increase from the boundary 1bc between the end portion 1bb and the main part 1ba toward the end portion 1bb side.

The inner-side guide member 1 is held rotatably around the central axis C1 of the tubular structure 10. The central axis C1 of the tubular structure 10 may be the same as the central axis of the inner-side guide member 1. The inner-side guide member 1 rotates in one direction or the other around the central axis C1 of the tubular structure 10 by being supplied with a driving force from a driving source such as a motor.

A cover 4 covers the inner-side guide member 1. The cover 4 is arranged inside the tubular structure 10. As shown in FIGS. 1 and 2, the cover 4 is a tubular body, and has openings 4a and 4b that open on the outer peripheral surface of this tubular body. The opening 4b shown in FIG. 1 is arranged above the opening 4a shown in FIG. 2. The opening 4a has a size that allows the inner belt 2 to be introduced to the inner-side guide member 1 side, and penetrates the wall portion of the tubular body of the cover 4. The opening 4b has a size that allows the outer belt 5 to be introduced to the inner-side guide member 1 side, and penetrates the wall portion of the tubular body of the cover 4.

As shown in FIGS. 1 and 2, the lower belt case 3 accommodates the inner belt 2 so as to be supplied. The lower belt case 3 is arranged outside the cover 4. The lower belt case 3 has a ring shape centered on the central axis C1 of the tubular structure 10. The lower belt case 3 has a lower surface 3a and side walls 3b. The lower surface 3a is preferably annular and substantially perpendicular to the central axis C1. The side wall 3b is preferably raised from the outer edge of the lower surface 3a. Side wall 3b preferably extends annularly around central axis C1. When the inner belt 2 is housed in the lower belt case 3, the lower surface 3a supports the inner belt 2 housed in the lower belt case 3. Moreover, in such a case, the inner belt 2 is preferably wound along the side wall 3b around the central axis C1.

As shown in FIG. 1, the upper belt case 6 accommodates the outer belt 5 so as to be supplied. The upper belt case 6 is arranged outside the cover 4. The upper belt case 6 is provided above the lower belt case 3. The upper belt case 6 has a ring shape centered on the central axis C1 of the tubular structure 10.

Motion

The telescopic device 100 can expand or contract the tubular structure 10. The operation of the telescopic device 100 to expand the tubular structure 10 will be described. As shown in FIGS. 1 and 2, the inner-side guide member 1 rotates in one direction about the central axis C1. Then, the inner-side guide member 1 winds up the outer belt 5 and the inner belt 2. Subsequently, the outer belt 5 is fed from the upper belt case 6 through the opening 4b of the cover 4 to the inner-side guide member 1. An inner belt 2 is sent from a lower belt case 3 to an inner-side guide member 1 through an opening 4a of a cover 4. The outer belt 5 and the inner belt 2 are spirally wound around the inner-side guide member 1 while being engaged with each other. In other words, a transition is made from the separated state in which the outer belt 5 and the inner belt 2 are housed in the upper belt case 6 and the lower belt case 3 respectively, to the state in which the outer belt 5 and the inner belt 2 are spirally wound into a cylindrical configuration. Thereby, the tubular structure 10 is elongated.

Also, the operation of the telescopic device 100 for contracting the tubular structure 10 will be described. The inner-side guide member 1 rotates in the other direction around the central axis C1. Then, the outer belt 5 and the inner belt 2, which are already engaged and wound together, are unwound. Subsequently, the outer belt 5 is drawn into the upper belt case 6 from the inner-side guide member 1 through the opening 4b of the cover 4. The inner belt 2 is sent out from the inner-side guide member 1 to the lower belt case 3 through the opening 4a of the cover 4. The outer belt 5 is housed in the upper belt case 6. The inner belt 2 is housed in the lower belt case 3. In other words, a transition is made from the state of the tubular structure in which the outer belt 5 and the inner belt 2 are spirally wound to the separated state in which the outer belt 5 and the inner belt 2 are accommodated in the upper belt case 6 and the lower belt case 3, respectively. Thereby, the tubular structure 10 contracts.

In such an extension operation or a contraction operation of the telescopic device 100, transition is made between the separated state and the cylinder configuration state. As shown in FIG. 6, the inner belt 2 includes a contact portion 2f, a separation portion 2g, and an accommodated portion 2h. The contact portion 2f, the separation portion 2g, and the accommodated portion 2h are connected in the longitudinal direction of the inner belt 2 in this order. The contact portion 2f is spirally wound around the outer belt 5 and contacts the inner-side guide member 1. The separation portion 2g extends from the end portion of the contact portion 2f to the lower belt case 3 and is separated from the inner-side guide member 1. The accommodated portion 2h extends from the end portion of the separation portion 2g and is accommodated in the lower belt case 3. A side wall 3b of the lower belt case 3 extends annularly around the central axis C1. The accommodated portion 2h is wound along the inner wall surface of the side wall 3b.

A plurality of first protrusions 2a on the contact portion 2f are fitted with the first spiral groove 1b. The contact portion 2f, particularly the plurality of second protrusions (not shown) on the separation portion 2g side of the contact portion 2f are not fitted with the first spiral groove 1b and the second spiral groove 1c, and are separated from the inner-side guide member 1. As a result, the upper side of the contact portion 2f is held in the first spiral groove 1b. The lower side of the contact portion 2f is separated from the inner-side guide member 1 and the inner-side guide member 1 without being fastened.

The lower surface 3a of the lower belt case 3 pushes up the accommodated portion 2h. However, as described above, the distance between the end portion 1bb of the first spiral groove 1b and the main part 1ba is small. Therefore, the upper wall surface of the first spiral groove 1b is positioned closer to the tip side of the inner-side guide member (here, in the positive Z-axis direction) than the upper wall surface of the first spiral groove 91b shown in FIG. 8. Therefore, the plurality of first protrusions 2a are separated from the upper wall surface of the first spiral groove 1b, or even if they come into contact with the upper wall surface of the first spiral groove 1b, they hardly press against it. Even if the plurality of first protrusions 2a press against the upper wall surface of the first spiral groove 1b, the force with which the plurality of first protrusions 2a press against the upper wall surface of the first spiral groove 1b is smaller than the force with which the plurality of first protrusions 92a shown in FIG. 8 press against the upper wall surface of the first spiral groove 91b. Therefore, the main surface of the contact portion 2f is substantially parallel to the central axis C1. Similarly, the main surface of the accommodated portion 2h is substantially parallel to the central axis C1. As described above, the contact portion 2f, the separation portion 2g, and the accommodated portion 2h are connected in this order in the longitudinal direction of the inner belt 2. Therefore, the separation portion 2g hardly receives force in the twisting direction. As described above, it is possible to suppress the twisting of the inner belt 2 when transitioning between the separated state and the cylinder configuration state.

Further, the width Lb of the end portion 1bb of the first spiral groove 1b according to the first embodiment is wider than the width La of the main part 1ba of the first spiral groove 1b. As a result, the upper wall surface of the first spiral groove 1b can move toward the tip of the inner-side guide member 1 (here, in the positive direction of the Z axis). As a result, twisting of the inner belt 2 can be further suppressed.

One Variation of Inner-Side Guide Member

Figure 7:
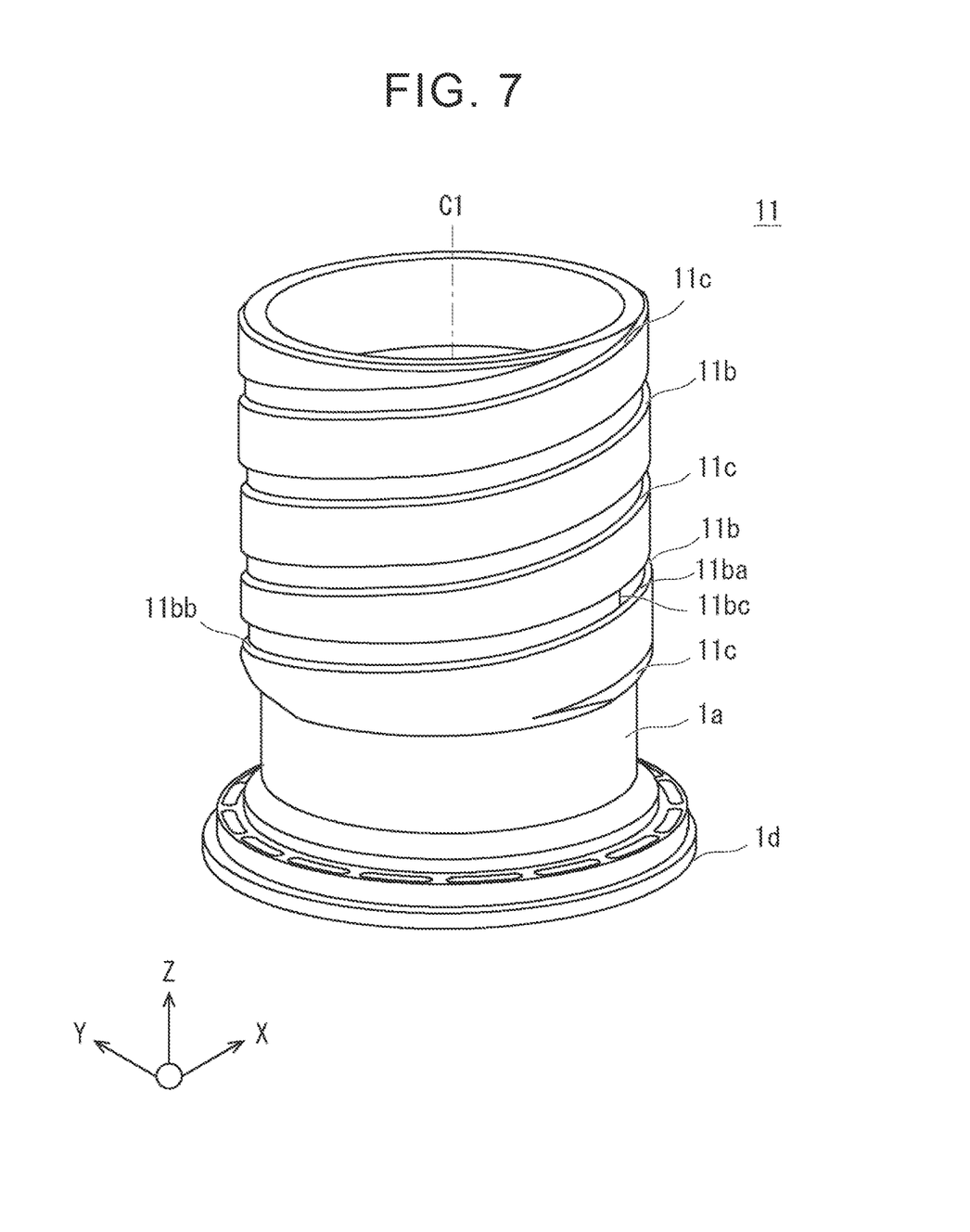
FIG. 7 is a perspective view of another example of the inner-side guide member according to Embodiment 1.

An inner-side guide member 11 shown in FIG. 7 is a modified example of the inner-side guide member 1. The inner-side guide member 11 has the same configuration as the inner-side guide member 1 except for the first spiral groove. The first spiral groove 11b has the same configuration as the first spiral groove 1b shown in FIGS. 4 and 5 except for the end portions. The first spiral groove 11b has a main part 11ba and an end portion 11bb. The end portion 11bb extends from the main part 11ba to the root side of the inner-side guide member 1. The spiral pitch of the end portion 11bb of the first spiral groove 11b is smaller than the spiral pitch of the width of the main part 11ba of the first spiral groove 11b. For example, the spiral pitch of the end portion 1bb may gradually decrease from the boundary 11bc between the end portion 11bb and the main part 11ba toward the end portion 1bb side. As a result, even when the telescopic device 100 includes the inner-side guide member 11, the upper wall surface of the first spiral groove 11b can move toward the tip of the inner-side guide member 11 (here, in the positive Z-axis direction). As a result, twisting of the inner belt 2 can be further suppressed.

The present disclosure is not limited to the above embodiments, and can be appropriately modified without departing from the spirit. Further, the present disclosure may be carried out by appropriately combining the above embodiments and examples thereof. For example, the second spiral groove 1c shown in FIG. 4 may have the same configuration as the first spiral groove 1b. That is, the second spiral groove 1c has a main part and an end portion extending from the main part to the root side of the inner-side guide member 1. The distance between the end portion of the second spiral groove 1c and the main part of the second spiral groove 1c is small. As with the telescopic device 100, this can suppress the inner belt 2 from twisting.

What is claimed is:
1. A telescopic device comprising:
   a tubular structure that is telescopable; and
   an inner-side guide member that is disposed on an inner side of the tubular structure, wherein
   the tubular structure includes an outer belt, and an inner belt disposed on an inner side of the outer belt,
   the outer belt and the inner belt are each provided with a plurality of first protrusions and holes arranged in a row in a longitudinal direction,
   the inner-side guide member has a first spiral groove extending along the first protrusions of the inner belt,
   rotation of the inner-side guide member in one direction feeds out the outer belt and the inner belt such that the outer belt and the inner belt are spirally wound in a state of being engaged with each other, and the tubular structure is extended,
   rotation of the inner-side guide member in another direction draws in the outer belt and the inner belt such that the state of being engaged with each other and wound is disengaged, and the tubular structure is collapsed, and
   the first spiral groove includes a main part, and an end portion extending from the main part to a basal side of the inner-side guide member, wherein
   the end portion of the first spiral groove has at least one of a thread pitch that is smaller than a thread pitch of the main part of the first spiral groove, or a width that is wider than a width of the main part of the first spiral groove.

* * * * *